(No Model.) 2 Sheets—Sheet 1.
W. BIDDLE.
MODE OF MOUNTING DYNAMOS ON CAR TRUCKS.
No. 523,453. Patented July 24, 1894.
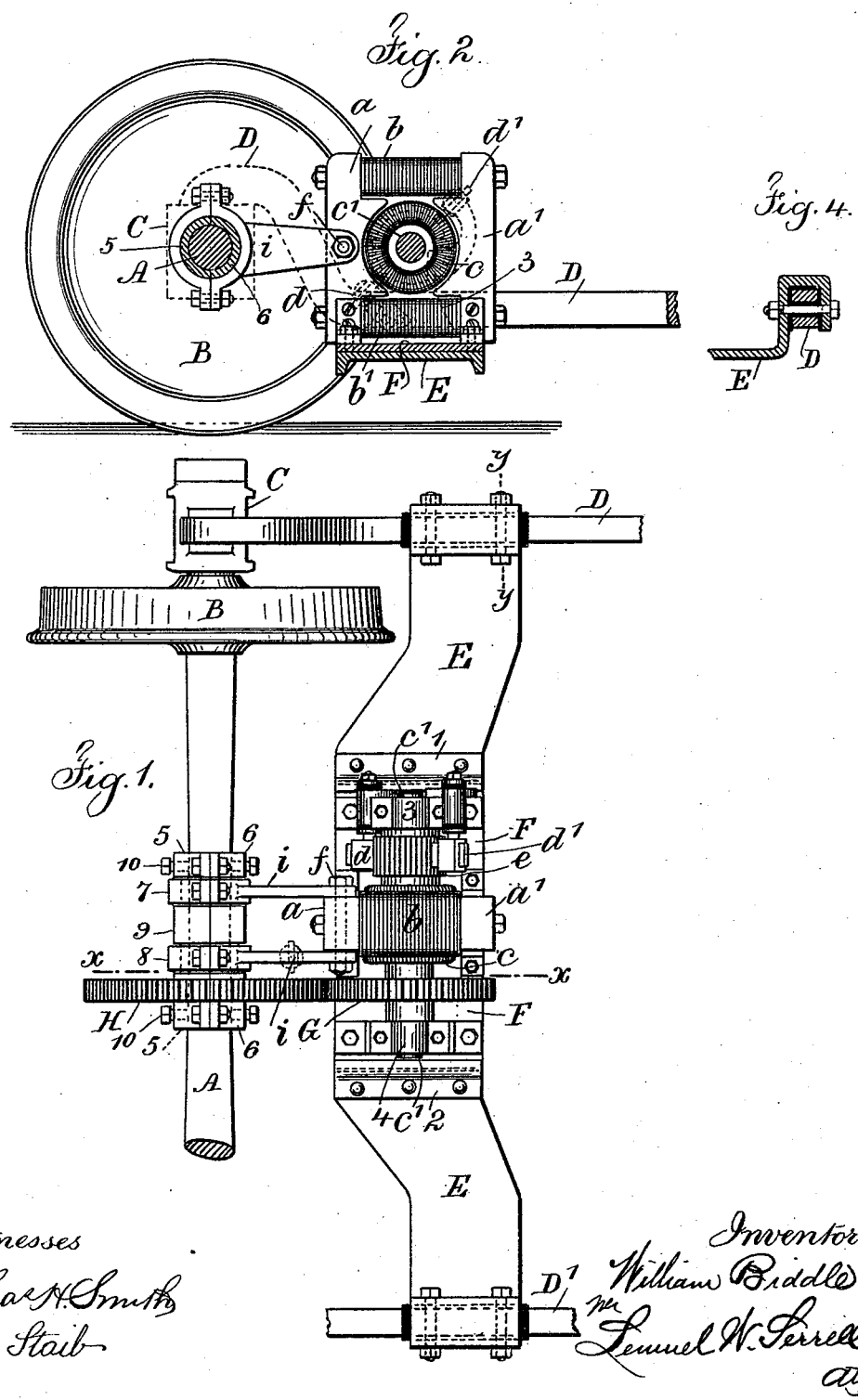

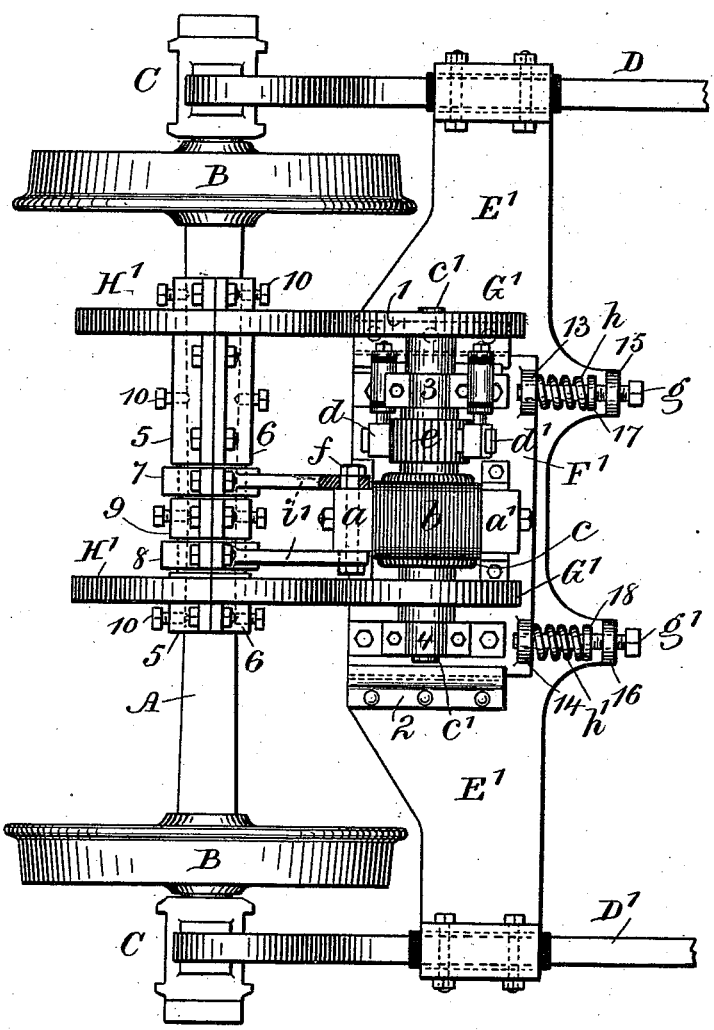

UNITED STATES PATENT OFFICE.

WILLIAM BIDDLE, OF BROOKLYN, ASSIGNOR TO THE AMERICAN RAILWAY ELECTRIC LIGHT COMPANY, OF NEW YORK, N. Y.

MODE OF MOUNTING DYNAMOS ON CAR-TRUCKS.

SPECIFICATION forming part of Letters Patent No. 523,453, dated July 24, 1894.

Application filed October 6, 1893. Serial No. 487,312. (No model.)

*To all whom it may concern:*

Be it known that I, WILLIAM BIDDLE, a citizen of the United States, residing at Brookyn, in the county of Kings and State of New York, have invented a new and useful Improvement in Electric Lighting for Railway-Cars, of which the following is a specification.

My invention relates to electric lighting for railway cars wherein a storage or secondary battery is employed to furnish the current for the incandescent lamps, said secondary or storage battery being charged by a dynamo operated from a car axle by its rotation, and my invention is an improvement upon the devices illustrated and described in the applications of Patrick Kennedy and myself, one filed April 20, 1893, Serial No. 471,063, and the other filed July 5, 1893, Serial No. 479,494. The devices shown in said applications were open to several objections, among which were imperfect insulation where the dynamo was connected to or in part supported by the car axle, and when thus supported there was considerable weight unnecessarily placed near the center of the car axle and consequently considerable wear in use, and the object of my present invention is to overcome these points of objection.

In carrying out my invention, which relates to the manner of supporting and actuating the dynamo, I support the dynamo directly from the equalizing bars of the truck, the dynamo resting upon a platform or cross girder whose respective ends are fastened securely to said equalizing bars, and at which point of connection a perfect insulation may be established. The armature shaft of the dynamo is provided with a pinion which is engaged by a wheel upon the car axle, and I provide connections from sleeves upon the car axle to one of the pole pieces of the dynamo, so that the dynamo is maintained in a constant relation to the car axle in order that the operative contact of the driving wheel and pinion may not be obstructed even if there is a slight endwise movement of the equalizing bars or lengthwise movement of the car axle, and in my improvement the entire weight of the dynamo is carried by the equalizing bars and the transverse platform or girder connected therewith.

In the drawings, Figure 1 represents by a plan view my improvements. Fig. 2 is a sectional elevation of the same at the line *x, x,* of Fig. 1. Fig. 3 is a plan view of a slight modification, and Fig. 4 is a cross section at *y, y,* of Fig. 1.

A represents the axle and B the wheels.

C represents the boxes, and D D' the equalizing bars that extend from the boxes of one pair of wheels to the boxes of the second pair of wheels of each truck, and E represents the transverse platform or girder extending across from and connected to said equalizing bars.

The manner of connecting the ends of the transverse platform with the equalizing levers may be by hangers or brackets and connecting bolts or in any other desired or convenient manner, and I prefer at this place to provide insulating material to separate the metallic faces, as shown in the cross section Fig. 4. Upon this transverse platform E are slide-ways 1, 2, and the dynamo is mounted upon a base plate F, which plate rests upon the transverse platform between the slide-ways, said base plate fitting loosely between the slide-ways so that it is free to move slightly lengthwise of the platform or crosswise thereof.

The dynamo consists of the pole pieces *a a',* the helices or magnets *b b',* the armature *c* and its shaft *c',* said shaft being mounted in bearings 3, 4 secured to and carried by the base plate F.

*e* is the commutator, and *d d'* represent the usual commutator brushes.

The parts composing the dynamo, the bearings for its armature shaft and the base plate F are all securely connected together so that they are adapted, as they rest upon the transverse platform, to move in either direction as an entirety.

Upon the armature shaft *c'* there is a pinion G and upon the axle A there is an engaging wheel H. The wheel H and the pinion G come together so that power is communicated from the rotating car axle to rotate the armature shaft and so operate the dynamo. The engaging wheel H is made in two parts, each part with a half hub 5, 6 upon connecting half sleeves, this construction being necessary in order to secure said wheel to the car axle A. The half sleeves and half hubs 5 6 surround the car axle A, and bolts pass through the hubs to securely hold the sleeves and hubs together upon the axle; and bolts 10 may be employed to insure the said parts from slip upon the car axle.

The wheel H and the pinion G are shown in Fig. 1 as provided with engaging and meshing teeth on their peripheries, while the wheels H' and pinions G' in the modification Fig. 3 are shown with smooth or friction faces.

I provide a means for connecting the axle A with the pole piece $a$ of the dynamo so that these two are maintained in a constant relation to one another, and I prefer these means to consist, as shown in the drawings, of the arms $i$, Figs. 1 and 2, and $i'$, Fig. 3, one end of each of said arms being formed with a half of the collars 7, 8, and said halves of the collars being bolted together around the axle A; the other ends of the arms $i\ i'$ are connected directly to the pole piece $a$ of the dynamo by a strong bolt $f$ which passes through the ends of these arms and through the pole piece. These ends of the arms $i\ i'$ and the bolts $f$ may be insulated if desired at the said pole piece, and the wheels H H' may also be insulated where they are secured to the car axle A. These arms $i\ i'$ may be entirely rigid or they may be provided with a universal joint, as indicated by dotted lines upon one of said arms in Fig. 1, which will permit a degree of lateral motion but no longitudinal motion which will disturb the relation of the axle A and dynamo.

I provide between the collars 7 8 a two-part central hub 9 integral with the half hubs 5 6 and their half sleeves to maintain said collars at the right distance apart, and as in Fig. 1, an outside two-part hub is also provided, and between said collars and hubs there is sufficient freedom of movement to provide for the slight longitudinal movement of the car axle in its boxes without necessarily straining or disturbing the arms $i\ i'$ passing to the dynamo.

In Fig. 3 which shows the engaging wheels H' and pinions G' with friction faces, I provide means for maintaining a close contact between said friction faces. The base plate F' is provided with rising lugs 13, 14 and the transverse platform or girder E' is also provided with rising lugs 15, 16, and screw bolts $g\ g'$ pass through the lugs 15, 16 and through holes in the lugs 13, 14, and said screw bolts are provided with integral disks 17, 18 between the opposite faces of which and the lugs 13, 14 and around said screw bolts are helical springs $h\ h'$. These springs exert a pressure to maintain the pinions G' in contact with the wheels H', and the pressure on these springs $h\ h'$ can be augmented if desired by turning up the screw bolts $g\ g'$. In this modification the arms $i'$ at the holes for the bolt $f$ are slightly slotted with the freedom of movement only in the direction of the car axle to provide for the application of the pressure hereinbefore described in increasing the friction between the pinions G' and wheels H'.

One wheel H' and one pinion G' might be employed, but I prefer two so as to more perfectly balance the action on the armature shaft.

I do not desire to limit myself to the wheel H and pinion G or the wheels H' and pinions G' with engaging teeth and friction surfaces, as it is obvious that any other and equivalent means of communicating power may be employed to equal advantage; the essential features of the invention being a support for the dynamo independent of the car axle, and a connection from the dynamo to the car axle, so that the relation of the two is maintained constant, sufficient play being provided not only for the longitudinal movement of the axle but for the movement either longitudinally or transversely of the equalizing bars and the transverse platform independent of the dynamo.

I claim as my invention—

1. The combination with the car axle and a dynamo, of the equalizing bars, a transverse platform connected to and supported by said equalizing bars and carrying the dynamo, a pinion upon the shaft of the dynamo, and an engaging wheel upon the car axle for operating the dynamo from the rotation of the car axle, and longitudinally inflexible connections from the car axle to one pole piece of the dynamo, whereby a constant relation is maintained between the car axle and dynamo, substantially as set forth.

2. The combination with a car axle, a dynamo and a bed plate for said dynamo, of the equalizing bars, a transverse platform connected at its ends to and supported by the equalizing bars, slide-ways 1, 2 upon said transverse platform and receiving between them the bed of the dynamo, a pinion upon the armature shaft of the dynamo, and a wheel upon the car axle engaging the same for communicating power to the dynamo from the rotation of the car axle, substantially as set forth.

3. The combination with a car axle, a dynamo and a base plate for said dynamo, of the equalizing bars, the transverse platform connected to and supported at its ends by said equalizing bars, slide-ways 1, 2 upon said platform and receiving the base plate of the dynamo, the arms, their collars and the bolt $f$ connecting the car axle and one pole piece of the dynamo, whereby an inflexible connection is formed between the car axle and the dynamo for maintaining a constant relation between the same, substantially as set forth.

Signed by me this 5th day of October, A. D. 1893.

WILLIAM BIDDLE.

Witnesses:
GEO. T. PINCKNEY,
A. M. OLIVER.